(12) United States Patent
van der Plas

(10) Patent No.: US 7,347,615 B2
(45) Date of Patent: Mar. 25, 2008

(54) MIXER WITH SMOOTHED MIXING ACTION

(75) Inventor: Nicolaas van der Plas, Oldenzaal (NL)

(73) Assignee: Trioliet Mullos B.V., Oldenzaal (NL)

( * ) Notice: Subject to any disclaimer, the term of this patent is extended or adjusted under 35 U.S.C. 154(b) by 227 days.

(21) Appl. No.: 10/816,783

(22) Filed: Apr. 2, 2004

(65) Prior Publication Data

US 2004/0252583 A1    Dec. 16, 2004

(30) Foreign Application Priority Data

May 28, 2003   (DE)   ........................... 203 08 404 U

(51) Int. Cl.
*B01F 7/24*   (2006.01)
(52) U.S. Cl. .................... 366/314; 366/319; 366/603
(58) Field of Classification Search ................ 366/266, 366/302, 306–307, 314, 318–324; 241/101.76, 241/101.761, 101.8, 260.1, 605
See application file for complete search history.

(56) References Cited

U.S. PATENT DOCUMENTS

| | | | | |
|---|---|---|---|---|
| 1,466,499 A | * | 8/1923 | Fletcher | 68/137 |
| 3,997,146 A | * | 12/1976 | Kline | 366/158.2 |
| 4,593,861 A | * | 6/1986 | Blakley et al. | 241/46.02 |
| 4,607,802 A | * | 8/1986 | Lamort | 241/46.017 |
| 4,725,007 A | * | 2/1988 | Chupka | 241/46.02 |
| 5,082,188 A | * | 1/1992 | Urich | 241/56 |
| 5,456,416 A | * | 10/1995 | Hartwig | 241/260.1 |
| 5,505,537 A | * | 4/1996 | Previero | 366/97 |
| 5,590,963 A | * | 1/1997 | Schuler | 366/302 |
| 5,601,362 A | * | 2/1997 | Schuler | 366/309 |
| 5,647,665 A | * | 7/1997 | Schuler | 366/196 |
| 6,328,465 B1 | * | 12/2001 | Tamminga | 366/314 |
| 7,004,617 B2 | * | 2/2006 | Albright et al. | 366/299 |
| 7,040,801 B2 | * | 5/2006 | Joranlien et al. | 366/314 |
| 2003/0169639 A1 | | 9/2003 | Plas | |
| 2003/0223308 A1 | * | 12/2003 | Knight | 366/314 |
| 2004/0008575 A1 | * | 1/2004 | Albright et al. | 366/299 |
| 2004/0252583 A1 | * | 12/2004 | Van Der Plas | 366/314 |
| 2005/0105390 A1 | * | 5/2005 | Albright | 366/314 |
| 2005/0169103 A1 | * | 8/2005 | Joranlien et al. | 366/314 |

FOREIGN PATENT DOCUMENTS

| | | | |
|---|---|---|---|
| DE | 4300548 C1 | * | 5/1994 |
| DE | 29911066 | | 12/2000 |
| DE | 10140458 A1 | * | 9/2002 |
| EP | 1417999 A2 | * | 5/2004 |
| GB | 2310793 A | * | 9/1997 |
| WO | 2007083998 A1 | * | 7/2007 |

* cited by examiner

*Primary Examiner*—Charles E. Cooley
(74) *Attorney, Agent, or Firm*—Darby & Darby P.C.

(57) ABSTRACT

A mixer (1) is described, in particular a feed mixer, has a mixing chamber (3), which is provided with a discharge opening (6) for the mix. A mixing screw (7), driven about a vertical rotating axis (7*a*), is accommodated in the mixing chamber (3). Furthermore, a rotary driven device (10) is provided for the smoothing of the discharge of the mix at the lower section of the mixing screw (7), and that moves across the discharge opening (6). To further smooth the discharge of the mix, a device (10) has a guide plate (11) with a surface (11*a*) on which the mix deposits to increase the action of the centrifugal force on the mix.

19 Claims, 4 Drawing Sheets

MIXER WITH SMOOTHED MIXING ACTION

FIELD OF THE INVENTION

The invention relates to a mixer, in particular a feed mixer.

BACKGROUND OF THE INVENTION

This type of mixer is known from DE-U-299 11 066. The known mixer contains a mixing screw which comprises a single spiral which is wound in a screw shape around a screw shaft. The spiral terminates in the lower section of the screw shaft with a take-up edge. The known mixing screw is furthermore provided with a short secondary blade, which is formed similar to another, but shorter spiral which extends from a minimum of 20° to a maximum of 360° around the screw shaft. The secondary blade is provided with a take-up edge which is arranged offset by 180° to the take-up edge of the actual spiral. The width of the secondary blade in the radial direction is a maximum in the region of the take-up edge and reduces continuously and prominently to zero with increasing distance from the take-up edge. The purpose of this secondary blade is to smooth out the discontinuous discharge of the mix, as observed with mixing screws with a single spiral, through the discharge opening, whereby the maximum amount of mix is always then output when the take-up edge of the spiral passes the discharge opening and whereby the amount of the discharge mix is then again substantially reduced. The object of the construction of the known mixing screw incorporates the idea that by arranging a second take-up edge two maxima in the mix discharge are obtained. This result is however not satisfactory.

Mixing devices with mixing screws are also fitted with the most varied additional equipment. For example, U.S. Pat. No. 5,456,416 shows a mixer in which the lower section of the mixing screw is extended radially outwards, as a type of blade, whereby the leading take-up edge is located exactly on the radial line to the rotating axis. A deflection plate is mounted on the upper side of the extended part to guide the mix in the direction of the rotating axis.

U.S. Pat. No. 5,590,963 shows a feed mixer which is fitted in the lower section of the mixing screw with three evenly spread pushing or smoothing blades. The blades are arranged with the outer sections of their take-up edges trailing and comprise a narrow, strip-type of design so that also nothing can be deposited here.

A similar construction is shown in U.S. Pat. No. 5,647,665.

U.S. Pat. No. 3,997,146 shows a feed mixer, the mixing screw of which is fitted in its lower section again with two strip-shaped scraping elements extending outwards, the edges of which run radially to the rotating axis.

GB-A 2 310 793 describes a feed mixer, which comprises a large number of different elements on the lower section of the mixing screw. For example, the mixing screw includes a strip-shaped carrier, the leading edge of which runs radially, and the upper side of which is fitted with blades. Furthermore, a paddle is fitted, which is joined to the rotating axis on an arm which is narrow in the circumferential direction. The paddle is formed constructively such that the mix dropping down in the vicinity of the boundary wall of the mixing chamber is pressed upwards, increasing the density of the material in this section.

BRIEF DESCRIPTION OF THE INVENTION

The object of the invention is to develop a mixer in a constructively simple manner, such that its discharge behavior with respect to the mix is improved or made more even.

This invention is based on the realization that, with an increase in the number of stirring tools or the take-up edges for pushing away the mix, it is not completely possible to even out the discharge of the mix. On the other hand, according to the invention it was found that a significantly better result is obtained when the action of the centrifugal force on the mix is increased or extended for this purpose in that a guide plate is provided which is fitted with a deposition surface for the mix on which the mix rests and from which the mix is gradually spun off by the rotation of the guide plate. In this way a substantially better and more even discharge of the mix out of the discharge opening is obtained in a constructively simple manner than could be achieved solely by the additional stirring action of the leading edge of the guide plate.

BRIEF DESCRIPTION OF THE DRAWINGS

Advantageous developments of the invention can be taken from the sub-claims.

Embodiments of the invention are explained in more detail in the following based on the drawings. The following are shown.

DETAILED DESCRIPTION OF THE INVENTION

Figure 1:
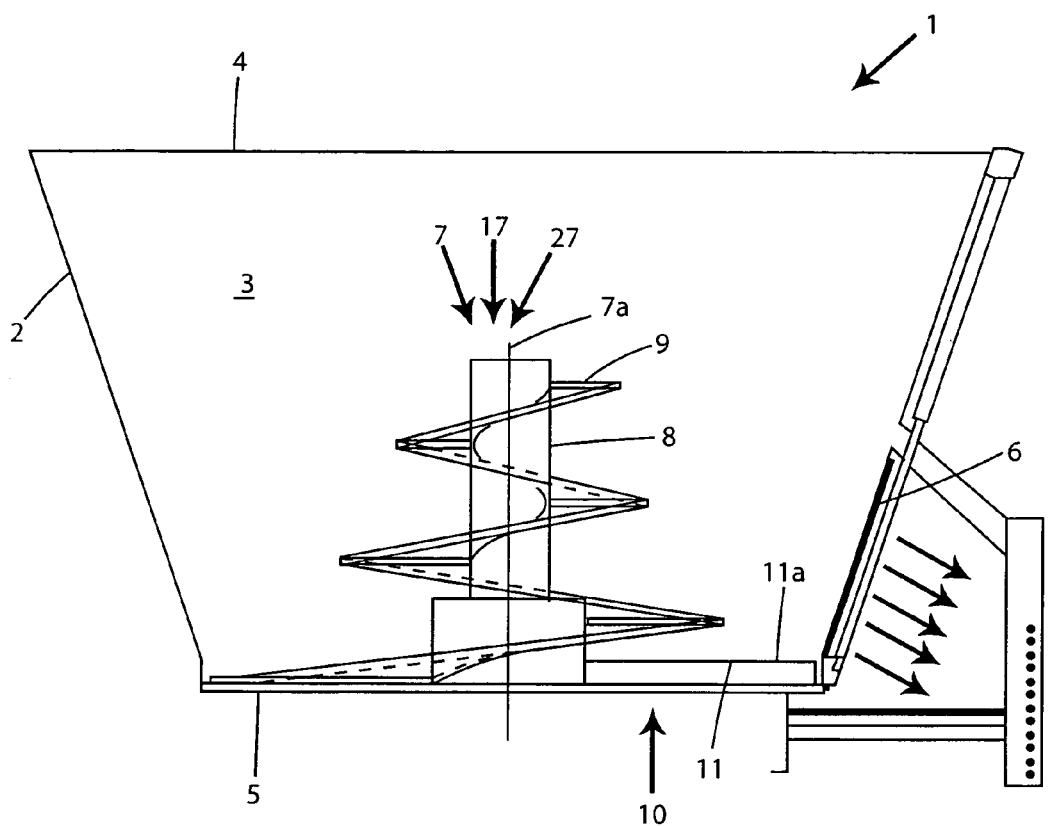
FIG. 1 a section through a mixer equipped according to the invention in a highly diagrammatical form, FIG. 2 an enlarged plan view of the mixing screw according to FIG. 1, FIG. 3 an enlarged side view of the mixing screw according to FIG. 1, FIG. 4 a plan view of a further embodiment of a mixing screw realized according to the invention, FIG. 5 the side view of the mixing screw of FIG. 4, FIG. 6 a plan view of a further embodiment of a mixing screw realized according to the invention, and FIG. 7 the side view of FIG. 6.

FIG. 1 shows in a highly diagrammatical form a mixer 1 which can be used as a feed mixer, for example, as a feed mixing vehicle. The mixer 1 contains a container 2, which comprises a mixing chamber 3 and which is accessible for charging via an upper opening 4 and is closed towards the bottom by a bottom 5.

A preferably closable discharge opening 6, through which the mix, in particular feed in straw form, is discharged is provided in the vicinity of the bottom 5 in one of the side walls of the container 2.

A mixing screw 7 around a vertical rotating axis 7a is arranged for rotation in the interior of the mixing chamber. The mixing screw 7 includes a screw shaft 8, which can, for example, be formed as a screw tube, and preferably a single spiral, or flight, 9 which is wound around it from a region in the vicinity of the bottom 5 up to the upper free end of the screw shaft 8. The spiral 9 has its largest radial extent in the region of the bottom 5 and narrows in the direction of the free upper end of the screw shaft 8. In the illustrated embodiment the narrowing is discontinuous, whereby the largest reduction occurs significantly more pronounced between the lowermost winding and the next higher winding than between the remaining windings. The pitch of the spiral 9 and, where necessary, a bending or curvature of its surface correspond to the relationships as for normal mixing screws for this application.

In the lower section of the mixing screw 7, slightly above the bottom 5, a device 10 for smoothing the discharge of the mix out of the discharge opening 6 is provided. The device 10 is formed such that the effect of the centrifugal force on the mix due to the rotation of the vertical rotating axis 7a increases. For this purpose at least one guide plate 11 is provided, which interacts with the start of the spiral 9 in the region of the bottom 5 and passes the discharge opening 6. Preferably however, two or three guide plates 11 are arranged symmetrically distributed about the vertical rotating axis at equal spacing, whereby only one of the guide plates interacts with the beginning of the spiral 9 and each guide plate 11 preferably extends over a maximum of 60°, because then an essentially continuous discharge volume of the mix can be achieved without the risk of blockages.

Figure 2:
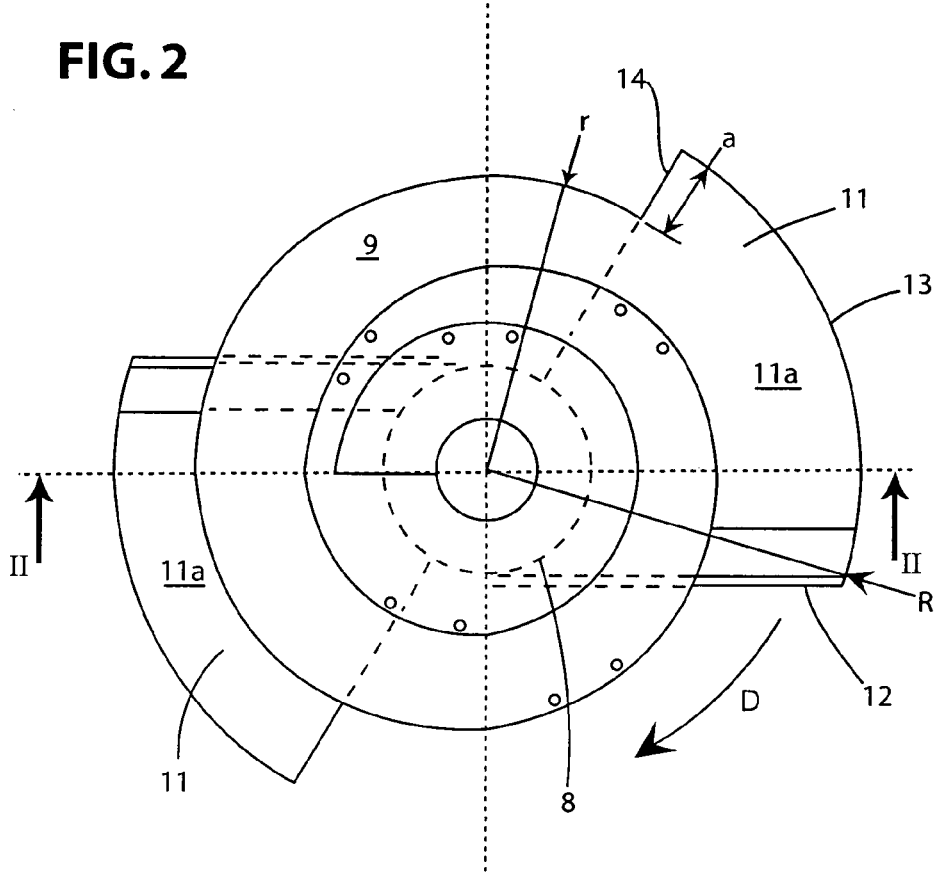
Figure 3:
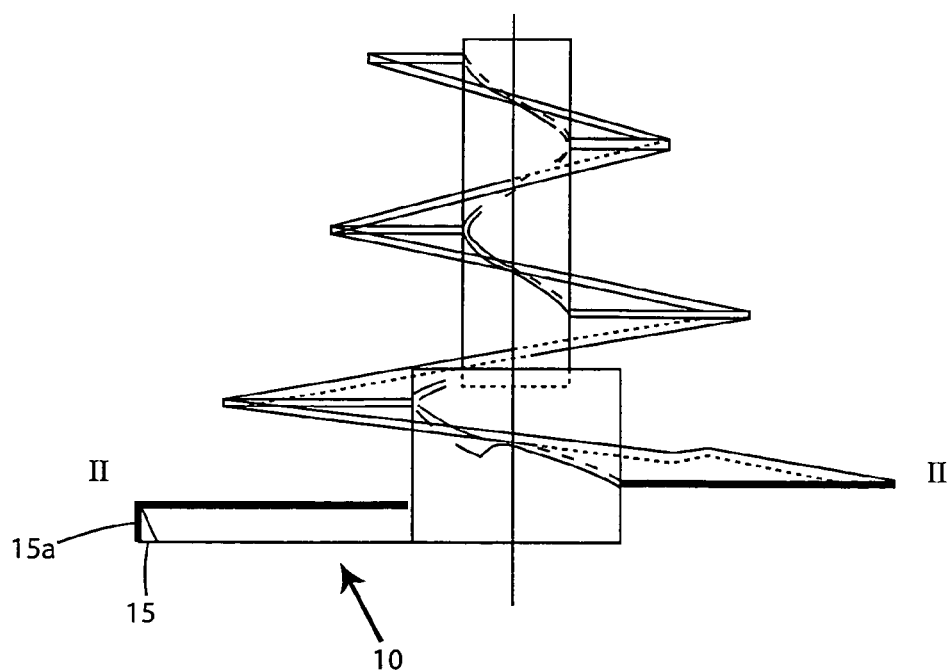

Each of the guide plates 11 illustrated in more detail in FIGS. 2 and 3 is formed in the illustrated embodiment approximately in the shape of a circular sector or cake slice and comprises a take-up edge 12, leading in the rotational direction D and which is preferably arranged at a take-up strip, a circumferential edge 13 and a trailing edge 14. Where it meets the take-up edge 12, the circumferential edge 13 has a distance R to the rotating axis 7a, which corresponds approximately to the radius of the bottom 5 or, with a non-circular bottom 5, the smallest distance of the circumference of the bottom 5 to the rotating axis 7a, so that the take-up edge 12 essentially passes over the complete bottom area. The distance R of the circumferential edge 13 remains essentially the same or only reduces insignificantly to the trailing edge 14. In the illustrated embodiment the circumferential edge 13 extends over an angular range of approximately 60°.

On the other hand the largest distance r of the spiral 9 of the mixing screw 7 from the rotating axis 7a is lower by the amount a than the distance R, so that the guide plate 11 protrudes along the whole circumferential edge 13 under the spiral 9, whereby the area 11a of the guide plate 11, pointing upwards, is formed as a deposition area for the mix. For a good deposition of the mix, the deposition surface 11a is formed preferably flat, i.e. not curved, but it can however be provided with a pitch from the take-up edge 12 in the direction of the trailing edge 14, which is the same or smaller than the pitch of the spiral 9.

The guide plate 11 is fitted asymmetrically in the illustrated embodiment, i.e. the outer region of the take-up edge 12, which meets the circumferential edge 13, is formed railing in the direction of rotation D with respect to the regions, located further inwards radially, of the take-up edge 12, whereby the take-up edge 12 preferably runs tangentially to the screw tube 8. The railing edge 14 runs essentially radially to the rotating axis 7a.

In the illustrated embodiment two essentially identically formed guide plates 11 are fitted and symmetrically offset, i.e. by 180°, about the rotating axis 7a. In this way a deposition surface 11a for falling mix is located under about 20% to about 40%, preferably 30% of the outer edge of the lowermost full winding of the spiral 9, so that a higher proportion of the mix which drops down between the screw and the side wall reaches the deposition surfaces 11a and is continually spun off by the centrifugal force during the rotation of the guide plates 11, so that this spinning off is superimposed on the radial pushing out action due to the two take-up edges 12 of the two guide plates 11 out of the discharge opening 6. In this way an essentially more even discharge of the mix out of the discharge opening 5 is achieved than would be possible just with the two take-up edges 12 alone.

In the illustrated embodiment the circumferential edge 13 of each of the guide plates 11 is provided with a mix deflecting area 15a which is arranged on an apron 15 which extends cylindrically downwards. The deflection area 15a is formed constructively in the same way and acts similar to the deflecting area of DE-U-202 01 339, the disclosure content of which is included here by reference. Due to this deflecting area, with mixers, which contain more than two mixing screws and for which transfer openings are provided between the mixing screws, the mix is prevented from being pressed back to the rear mixing screw by the mixing screw leading in the desired conveying direction. Here, the rotating positions of the mixing screws are mutually matched such that the transfer opening is closed by the apron 15 when the mixing screw leading in the desired conveying direction tends to press mix back to the rear mixing screw.

In the embodiments of a mixing screw 7 drawn in FIGS. 2 and 3, one of the guide plates 11 is formed in one piece with the spiral 9 or with the plate trailing edge 14 welded to its lower leading edge so that the take-up edge 12 of this guide plate 11 acts as the take-up edge for the spiral 9.

FIGS. 4 to 7 show versions of this construction.

Figure 4:
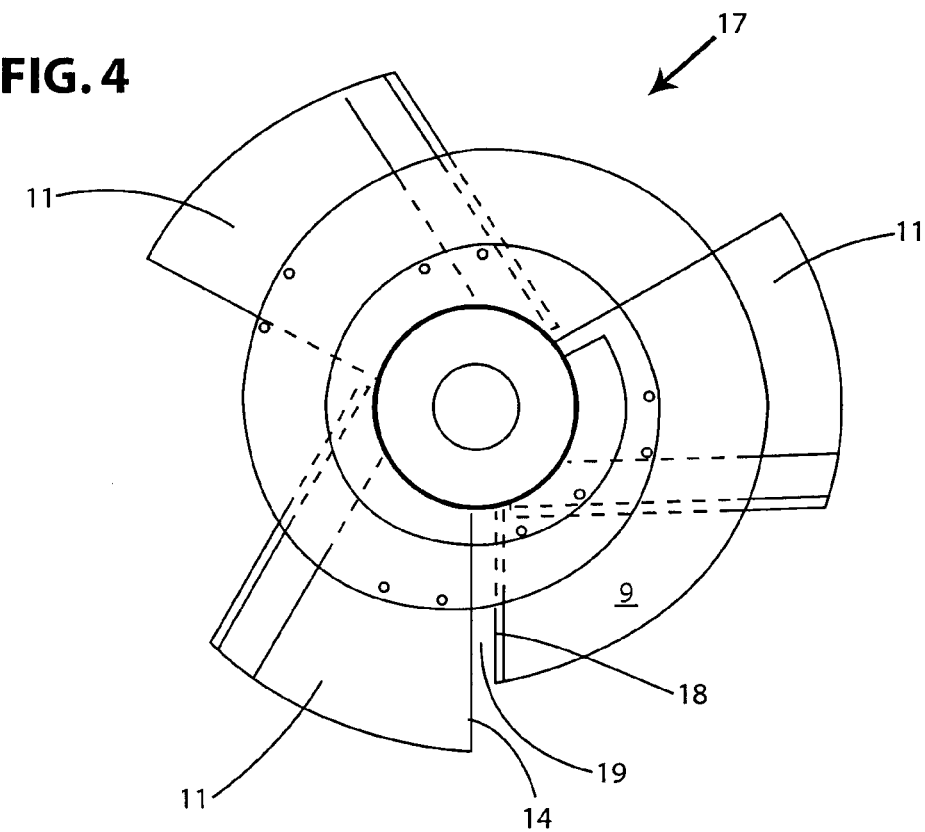
Figure 5:
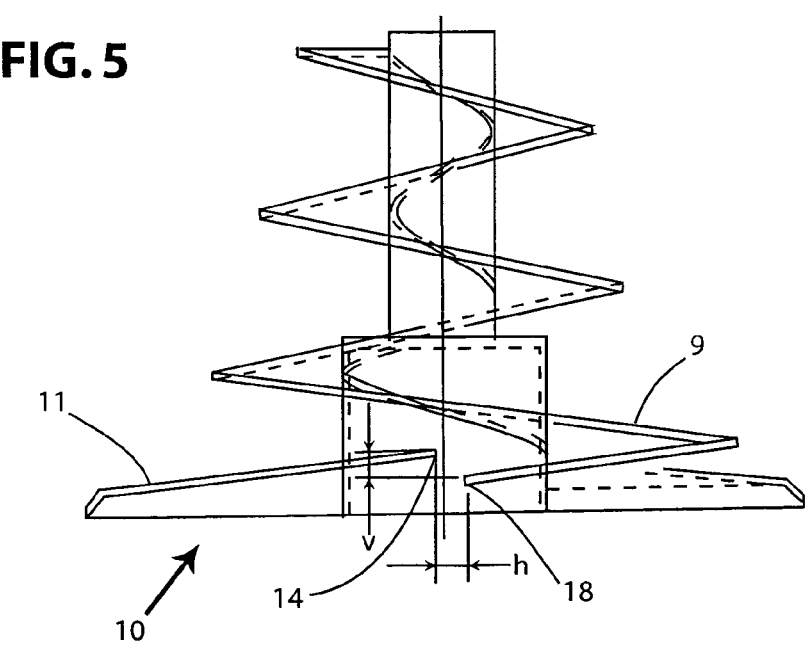

FIGS. 4 and 5 show another device 10 for smoothing the discharge of the mix with a mixing screw 17 which essentially only differs from the mixing screw 7 by a larger number of guide plates 11, whereby in this case three identically formed guide plates 11 are provided which are essentially formed and arranged similar to the guide plates 11 of FIG. 2, but which in each case can extend over an angular range of less than 600. In the total amount however the deposition areas 10a cover again preferably 30% r 120%. All three guide plates 11 are arranged in the same plane.

Another special feature of the mixing screw 17 relates to the arrangement of the first guide plate 11, assigned to the lower end of the spiral, or flight, 9. As shown, particularly by FIG. 5, the spiral 9 has in the normal way a free take-up edge 18, which extends essentially radially to the rotating axis 7a. This take-up edge 18 is, as usual, arranged in the vicinity of the bottom 5. The directly following guide plate 11 comprises essentially the same pitch as the spiral 9 and, with its trailing edge 14 at a vertical distance v and a horizontal distance h, it is however arranged parallel to the take-up edge 18 so that a gap 19 is formed between the take-up edge 18 of the spiral 9 and the trailing edge 14 of the contacting guide plate 11.

Figure 6:
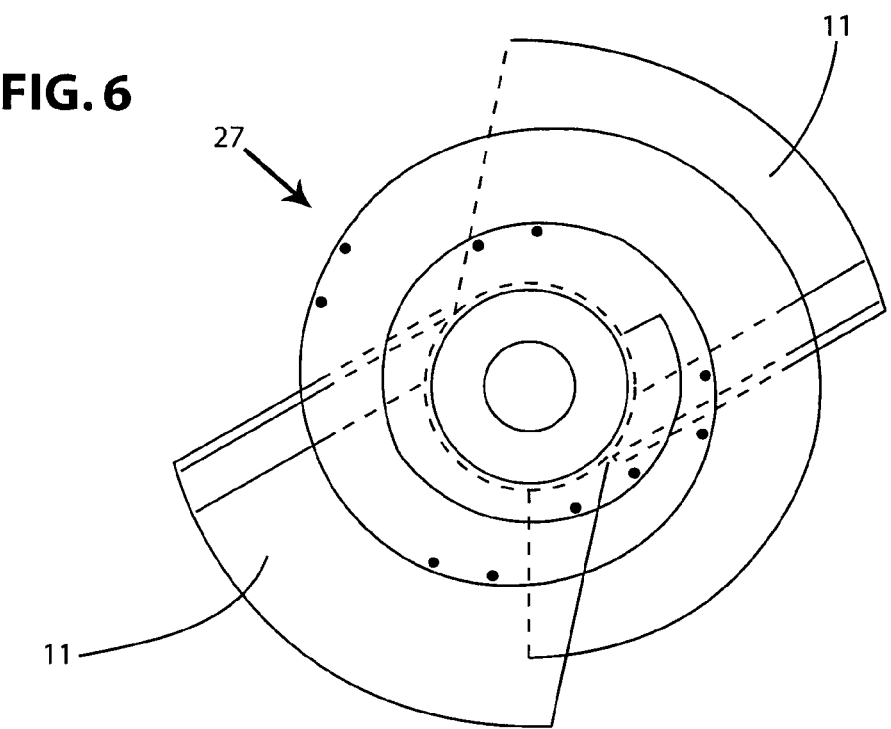
Figure 7:
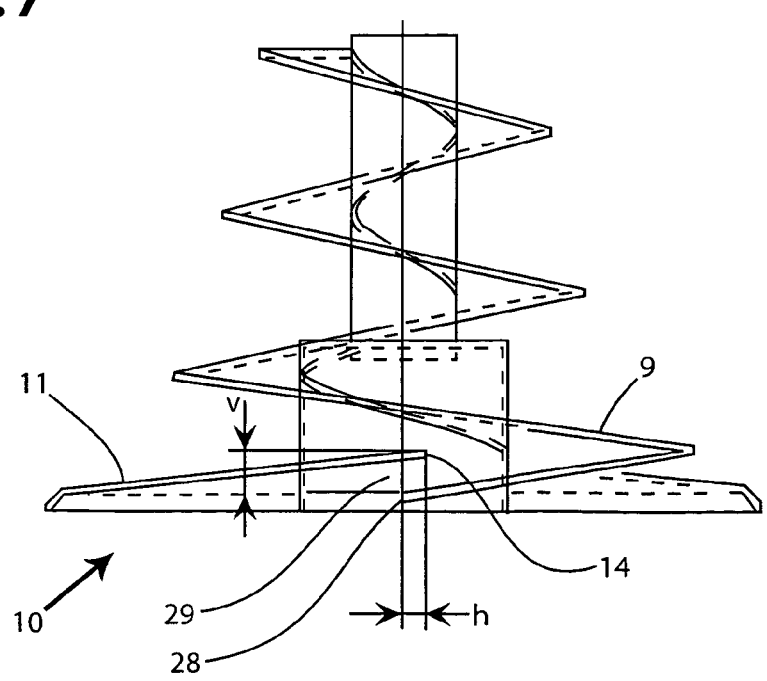

FIGS. 6 and 7 show a further embodiment of a device 10 according to the invention for smoothing the discharge of the mix with a mixing screw 27, which differs from the mixing screw according to FIGS. 2 and 3 in that the spiral 9, as with the embodiment according to FIGS. 4 and 5, comprises its own take-up edge 28, which is arranged at a vertical distance v and horizontal distance h below the trailing edge 14 of the contacting guide plate 11, in contrast to FIGS. 4 and 5 however so that both edges 14 and 18 overlap in the vertical direction so that both edges border a gap 29 extending in the vertical direction.

The invention is not limited to the described and illustrated embodiments. For example, each embodiment of a mixing screw according to the invention can be equipped with two, three or even more guide plates, which are however preferably evenly spaced and arranged with trailing or tangential take-up edges around the rotating axis. Consequently, that portion of the circumferential edge of the lower full winding of the spiral, which has beneath it a deposition surface of the guide plate, can be substantially increased. Instead of the mixing screw illustrated in FIG. 1, mixing screws with a uniformly narrowing or constantly large spiral can be used.

The invention claimed is:

1. A feed mixer comprising:
   a mixing chamber having a bottom and a discharge opening for a mix;
   a mixing screw in the mixing chamber and driven about a vertical rotational axis, the mixing screw including at least one flight that has a leading edge arranged adjacent to the chamber bottom, and the flight being dimensioned to have its greatest distance to the rotational axis at the leading edge, and tapers upwardly, and
   a rotary driven device for smoothing the discharge of the mix in the lower section of the mixing screw assigned to the discharge opening, the device containing at least two guide plates equally spaced around the rotational axis to increase the action of the centrifugal force in the mix;
   each guide plate having a leading take-up edge, a trailing edge, and an upwardly facing deposition surface for the mix having a radially outer boundary with a circumferential length and a distance to the rotational axis;
   the trailing edge of one of the guide plates is fixedly attached to the leading edge of the flight;
   wherein the distance of the boundary of each deposition surface to the rotational axis is essentially equal along its circumferential length in rotating direction, and is greater than the greatest distance of the flight to the rotational axis; and
   wherein said guide plate deposition surface comprises a greater width in the direction of rotation in an outer region radially with regard to said rotational axis than in a radially inner region.

2. Mixer according to claim 1, wherein said guide plate deposition surface takes up approximately 20% to approximately 40%, preferably approximately 30%, of the angular range around the rotating axis.

3. Mixer according to claim 1, wherein said guide plate deposition surface comprises a shape similar to a circular sector or cake slice.

4. Mixer according to claim 1, wherein said leading take-up edge of said guide plate comprises a radially outer section and a radially inner section, said radially outer section is arranged trailing compared to said radially inner section in the direction of rotation.

5. Mixer according to claim 4, wherein said take-up edge runs substantially tangential to said rotational axis.

6. Mixer according to claim 1, wherein said deposition surface runs at a downward pitch angle relative to said vertical rotational axis.

7. Mixer according to claim 1, wherein said guide plate deposition surface is flat and generally transverse to said vertical rotational axis.

8. Mixer according to claim 1, wherein a said mixing screw flight has the diameter of the lowermost winding compared to the diameter of the second lowermost winding narrows more than the diameter of the second lowermost winding compared to the diameter of the winding following the second lowermost winding.

9. A feed mixer comprising:
   a mixing chamber, which is provided with a bottom and a discharge opening for a mix;
   a mixing screw accommodated in the mixing chamber and driven about a vertical rotational axis, the mixing screw including at least one flight, the flight includes a leading edge arranged adjacent the bottom, and the flight being dimensioned to have its greatest distance to the rotational axis at the leading edge, and tapered upwardly; and
   a rotary driven device for smoothing the discharge of the mix which is provided in the lower section of the mixing screw assigned to the discharge opening, the device containing at least two guide plates equally spaced around the rotational axis to increase the action of the centrifugal force on the mix;
   each guide plate includes a leading take-up edge, a trailing edge, and an upwardly facing deposition surface for the mix having a radially outer boundary with a circumferential length and a distance to the rotational axis;
   the trailing edge of one of the guide plates is arranged at a vertical distance above and a horizontal distance to the leading take-up edge of the flight;
   wherein the distance or the boundary of each deposition surface to the rotational axis is essentially equal along its circumferential length in rotating direction, and is greater than the greatest distance of the flight to the rotational axis.

10. Mixer according to claim 9, wherein said guide plate deposition surface takes up approximately 20% to approximately 40%, preferably approximately 30%, of the angular range around the rotational axis.

11. Mixer according to claim 9, wherein said guide plate deposition surface comprises a greater width in the direction of rotation in an outer region radially with regard to said rotational axis than in a radially inner region.

12. Mixer according to claim 11, wherein said guide plate deposition surface comprises a shape similar to a circular sector or cake slice.

13. Mixer according to claim 9, wherein said leading take-up edge of said guide plate comprises a radially outer section and a radially inner section, said radially outer section is arranged trailing compared to said radially inner section in the direction of rotation.

14. Mixer according to claim 9, wherein said leading take-up edge of said guide plate runs substantially tangential to said rotational axis.

15. Mixer according to claim 9, wherein said deposition surface runs at a downward pitch relative to said vertical rotational axis.

16. Mixer according to claim 9, wherein said guide plate deposition surface is flat and generally transverse to said vertical rotational axis.

17. Mixer according to claim 9, wherein a trailing edge of one of said guide plates is arranged at a vertical distance above and a horizontal distance in front of the leading take-up edge of the flight of the mixing screw.

18. Mixer according to claim 9, wherein a trailing edge of one of said guide plates is arranged at a vertical distance above the leading take-up edge of the mixing screw and is overlapping the leading take-up edge with a horizontal distance.

19. Mixer according to claim 9, wherein the mixing screw comprises a flight with which the diameter of the lowermost winding compared to the diameter of the second lowermost winding narrows more than the diameter of the second lowermost winding compared to the diameter of the winding following the second lowermost winding.

* * * * *